June 8, 1948.   E. A. ULRICH   2,443,087
FILTER LEAF

Filed March 26, 1945   2 Sheets-Sheet 1

INVENTOR
EDWARD A. ULRICH
BY
Beau, Brooks, Buckley & Bean.   ATTORNEYS

June 8, 1948.  E. A. ULRICH  2,443,087
FILTER LEAF

Filed March 26, 1945  2 Sheets—Sheet 2

INVENTOR
EDWARD A. ULRICH
BY
Bean, Brooks, Buckley & Bean. ATTORNEYS

Patented June 8, 1948

2,443,087

UNITED STATES PATENT OFFICE 2,443,087

FILTER LEAF

Edward A. Ulrich, Kenmore, N. Y., assignor to Arnold Jacobowitz, Buffalo, N. Y.

Application March 26, 1945, Serial No. 584,776

5 Claims. (Cl. 210—195)

This invention relates to industrial filter and screening devices, and more particularly to improvements in leaf filter or screen devices such as are used in processing liquid comestibles such as milk or beer or vegetable oils or other materials such as are susceptible of deterioration or such as are otherwise of such characteristics as to cause it to be undesirable to permit deposits from the filtered substance to accumulate over substantial periods of time within the filtering or screening devices.

One of the objects of the invention is to provide an improved filter leaf unit of the character referred to hereinabove. Another object of the invention is to provide an improved filter leaf unit which is adapted to be readily disassembled and reassembled to facilitate effective cleaning and/or sterilizing of the interior parts thereof. Another object of the invention is to provide an improved filter leaf unit of the character described which is structurally simple and rugged and inexpensive to provide. Another object of the invention is to provide a filter unit of the character described which is readily separable for interior cleaning purposes without requiring the use of detachable connection devices such as bolts and screws and gaskets in order to provide fluid tight assembly thereof.

Another object of the invention is to provide an improved filter leaf unit of the character described which is adapted to avoid unduly rapid accumulations therein of solids from the filtered substance. Another object of the invention is to provide a filter leaf unit embodying the features outlined hereinabove and which is adapted to be assembled and disassembled with improved facility. Other objects and advantages of the invention will appear from the specification hereinafter.

Figure 3:
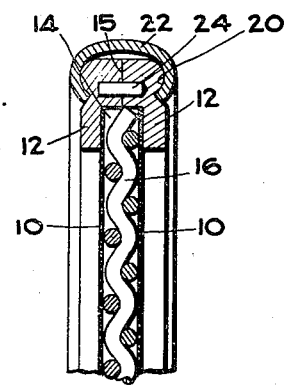
Fig. 3 is a fragmentary section, on an enlarged scale, along line III—III of Fig. 1.
Figure 5:
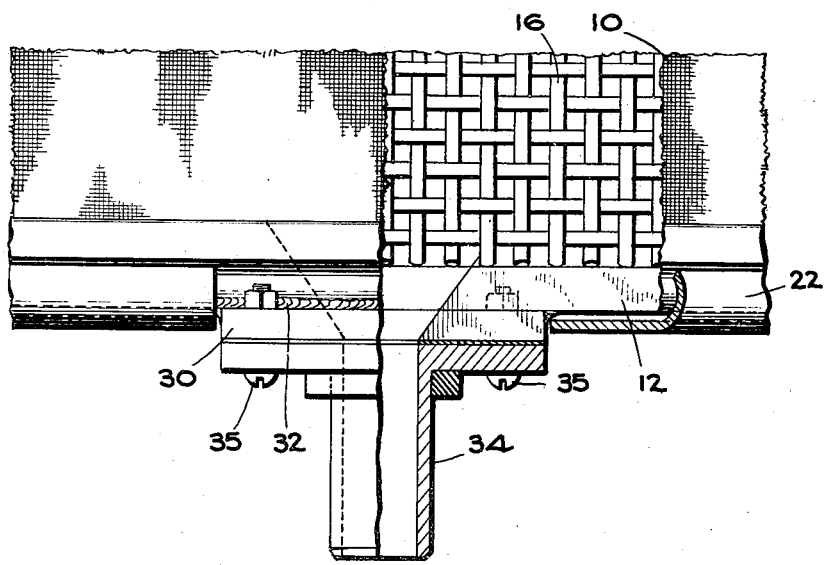
Fig. 5 is a fragmentary illustration, on an enlarged scale, of the filter nozzle portion of Fig. 1, with parts broken away to show the interior thereof.
Figure 6:
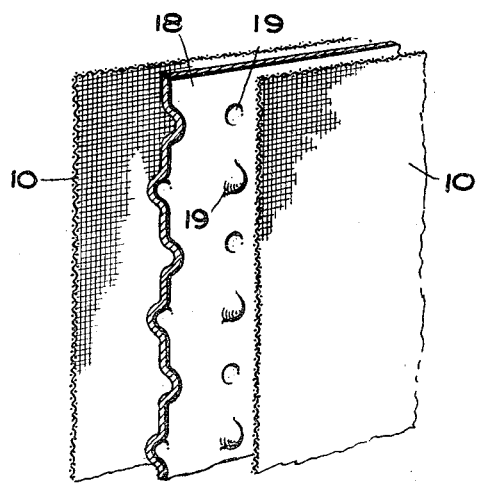
Fig. 6 is a fragmentary perspective illustrating another form of filter screen and spacer arrangement.

The invention is illustrated in Figs. 1–5 to comprise a filter leaf unit consisting of opposed spaced meshed wire screens 10—10 which are soldered or welded or otherwise firmly attached in fluidtight relation to corresponding marginal framing members 12—12. As illustrated in Fig. 3, the framing members 12—12 are recessed at 14 so as to be adapted to be assembled in back-to-back relation at their abutting faces 15 while thereby disposing the screen cloth portions 10—10 in parallel spaced relation. A screen cloth spacing device such as a coarse woven screen member 16 may be disposed between the screen cloth sections 10—10 so as to maintain the latter in relatively spaced relation throughout the central regions thereof even though substantial fluid pressures may be applied against the screen cloth elements from exteriorly thereof. Or, as shown in Fig. 6, the spacer device may comprise a metal plate or the like as indicated at 18, which has been dimpled as indicated at 19 or otherwise distorted so as to be irregularly surfaced to provide open fluid passageways between the screen cloth elements and opposite faces of the spacer device.

Figure 1:
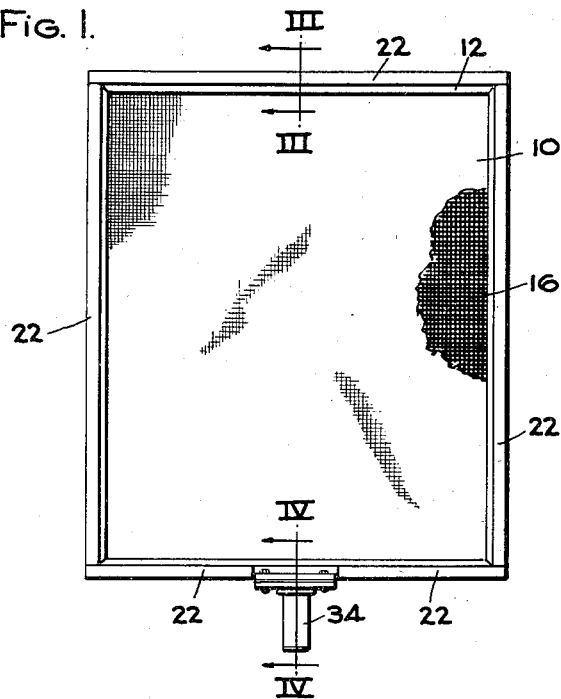
Fig. 1 illustrates a filter leaf unit of the invention in side elevation.
Figure 2:
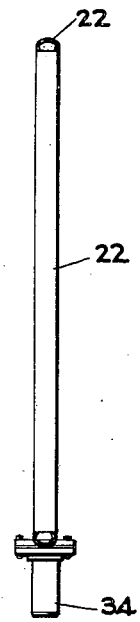
Fig. 2 is an end elevation thereof.
Figure 4:
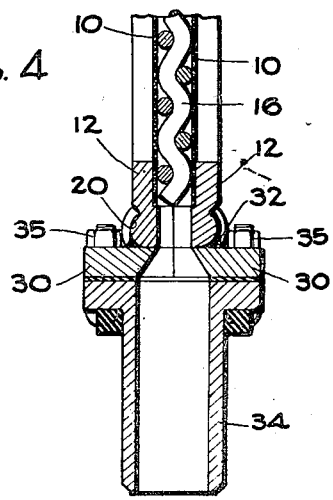
Fig. 4 is a fragmentary section, on an enlarged scale, taken along line IV—IV of Fig. 1.

Referring again to Figs. 1–5, the framing elements 12—12 are exteriorly rounded and grooved as indicated at 20 so as to be adapted to receive therein opposite edges of channel-shaped clamping devices 22 which are preferably formed of spring steel or other suitable material so as to be adapted to be either snap-fitted or slipped endwise over the rounded outer surfaces of the framing elements for firmly clamping the latter together in pressured back-to-back relation; thus bringing the opposite screen cloth element 10—10 into relatively assembled parallel relation with the spacer device therebetween. This arrangement provides sealing pressures continuously around the screen frame perimeter, as distinguished from spaced localized pressures such as would be provided by bolts or the like. Therefore, in the filter leaf of the invention optimum sealing effects are procured without the use of accessory gasket devices and the like. Preferably, complementing pin and socket devices as indicated at 24 will be provided in opposite registering portions of the framing elements for relatively positioning the filter screen elements properly prior to mounting of the clamping elements 22 thereon. The filtrate outlet nozzle of the filter leaf unit is provided by welding split collar portions 30—30 to suitable cut-away bottom portions of the framing members 12—12, as by means of welding illustrated at 32. A flanged nozzle 34 may then be simply bolted to the filter leaf unit as by means of bolts 35—35 (Fig. 4).

Figure 7:
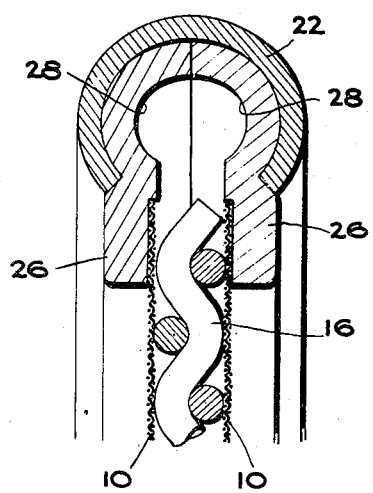
Fig. 7 is a view similar to Fig. 3 showing another form of filter screen marginal binding and clamping arrangement.

Fig. 7 illustrates a modified form of the framing elements of the filtering screen cloth devices. In this case the framing elements are designated at 26—26 to possess external configuration identical to the devices 12—12 of Figs. 1-5; but in the case of Fig. 7 the framing elements are interiorly hollowed as at 28 to provide, when relatively assembled, an open channel extending perimetrically of the filter leaf unit and in open communication throughout the entire perimeter thereof with the space between the filtering screen cloth devices 10—10.

Thus, it will be understood that the perimetral fluid chamber provided by the channeled portions 28 in the framing elements will permit free flow of filtrate therethrough into the outlet nozzle 34; and that subsequent to passing through the filter screen cloths 10—10 the filtrate will flow through the space between the screen cloths in the radial directions representing the shortest paths into the perimetral fluid channels interiorly of the framing elements, for conveyance through the latter toward the outlet nozzle 34. In this manner, a system of fluid circulation is established interiorly of the filter leaf unit which involves initial filtrate flow through the space between the screen elements in directions radially and outwardly to positions beyond the marginal edges of the screen elements and their unobstructed flow through the frame open channels, whereby there will be no fluid flow directional changes interiorly of the edge portions of the screen cloth elements such as would otherwise tend to cause deposit of solids accumulations in these portions of the filtrate leaf unit. Therefore, it will be understood that a particular feature and advantage of the invention, in addition to the ability of the filter leaf unit to be readily disassembled for internal scrubbing and cleansing thereof, is that due to the mode of construction of the filter leaf unit there is less tendency for the latter to accumulate solids deposits interiorly thereof, compared to similar devices of the prior art.

In order to disassemble the filtrate leaf unit of the invention for interior cleansing purposes it is only necessary to slide the clamping elements 22 out of clamping position relative to the framing members of the filter unit, and to unbolt the nozzle 34 therefrom, whereupon the two sections of the filter leaf unit are free to be separated and may be both interiorly and exteriorly scrubbed or otherwise cleaned, as may be required. Upon completion of the cleansing operations the filter unit sections may then be simply brought together again in back-to-back relation and locked in superior leak-proof manner by snapping or sliding the clamping strips 22 into assembled positions thereon.

It will be appreciated that although only a few forms of the invention have been illustrated and described in detail, the invention is not so limited and that various changes may be made therein without departing from the spirit of the invention and the scope of the appended claims.

I claim:

1. A filter leaf unit comprising two oppositely disposed frame elements, each having a rounded outer peripheral edge extending along substantially the entire length of the periphery, each of said elements being formed with a complemental recess in its adjacent face and a surface designed to engage the coacting surface of the adjacent element in mutual fluid-sealing contact, a filter screen for each element permanently secured in the recess thereof, C-shaped clamping means of resilient material shaped to engage the rounded periphery of the assembled elements, an outlet member comprising a two-piece split collar portion, each portion being secured to one of said elements, and an outlet nozzle portion removably secured to the assembled collar portions.

2. A filter leaf unit comprising two oppositely disposed frame elements, each having a rounded outer peripheral edge extending along substantially the entire length of the periphery and formed with a clamp-receiving groove located back of the peripheral edge, each of said elements being formed with a complemental recess in its adjacent face and a surface designed to engage the coacting surface of the adjacent element in mutual fluid-sealing contact, a filter screen for each element permanently secured in the recess thereof, C-shaped clamping means of resilient material shaped to conform to and engaged with the rounded periphery of the assembled elements, said means having parallel edges for engagement with the grooves of said elements, an outlet member comprising a two-piece split collar portion, each portion being secured to one of said elements, and a flanged outlet nozzle portion removably secured to the assembled collar portions.

3. A filter leaf unit comprising two oppositely disposed frame elements, each having a rounded outer peripheral edge extending along substantially the entire length of the periphery, each of said elements being formed with a complemental recess in its adjacent face and a surface designed to engage the coacting surface of the adjacent element in mutual fluid-sealing contact, a filter screen for each element permanently secured in the recess thereof, a backing plate disposed between said screens when assembled and having a plurality of oppositely extending protuberances for keeping said screens in spaced relation, C-shaped clamping means of resilient material shaped to engage the rounded periphery of the assembled elements, an outlet member comprising a two-piece split collar portion, each portion being secured to one of said elements, and a flanged outlet nozzle portion removably secured to the assembled collar portions.

4. A filter leaf unit comprising two oppositely disposed frame elements, each having a rounded outer peripheral edge extending along substantially the entire length of the periphery and formed with a clamp-receiving groove located back of the peripheral edge, each of said elements being formed with a complemental recess in its adjacent face and a surface designed to engage the coacting surface of the adjacent element in mutual fluid-sealing contact, a filter screen for each element permanently secured in the recess thereof, a backing plate disposed between said screens when assembled and having a plurality of oppositely extending protuberances for keeping said screens in spaced relation, C-shaped clamping means of resilient material shaped to engage the rounded periphery of the assembled elements, said means having parallel edges for engagement with the grooves of said elements, an outlet member comprising a two-piece split collar portion, each portion being secured to one of said elements, and a flanged outlet nozzle portion removably secured to the assembled collar portions.

5. A filter leaf unit comprising two oppositely disposed frame elements, each having a rounded outer peripheral edge extending along substantially the entire length of the periphery and formed with a clamp-receiving groove located back of the peripheral edge, each of said elements being formed with a complemental recess in its adjacent face and a surface designed to engage the coacting surface of the adjacent element in mutual fluid-sealing contact, a filter screen for each element permanently secured in the recess thereof, a backing plate disposed between said screens when assembled and having a plurality of oppositely extending protuberances for keeping said screens in spaced relation, means carried by said elements for retaining the same in alignment, C-shaped clamping means of resilient material shaped to engage the rounded periphery of the assembled elements, said means having parallel edges for engagement with the grooves of said elements, an outlet member comprising a two-piece split collar portion, each portion being secured to one of said elements, and a flanged outlet nozzle portion removably secured to the assembled collar portions.

EDWARD A. ULRICH.

REFERENCES CITED

The following references are of record in the file of this patent:

UNITED STATES PATENTS

| Number | Name | Date |
|---|---|---|
| 2,061,351 | Denhard | Nov. 17, 1936 |
| 2,240,793 | Marvel | May 6, 1941 |
| 2,328,148 | Jacobowitz | Aug. 31, 1943 |

FOREIGN PATENTS

| Number | Country | Date |
|---|---|---|
| 133,185 | Germany | Aug. 14, 1902 |
| 4,875 | France | Aug. 19, 1905 |
| | 1st addition of 312,867 | |